Jan. 9, 1951   A. WICKESSER   2,537,498
TOTALIZING LIQUID LEVEL GAUGE
Filed Oct. 2, 1945   4 Sheets-Sheet 1

INVENTOR.
ARTHUR WICKESSER
BY
Ernest D. Given
ATTORNEY

Jan. 9, 1951 A. WICKESSER 2,537,498
TOTALIZING LIQUID LEVEL GAUGE
Filed Oct. 2, 1945 4 Sheets-Sheet 2

INVENTOR.
ARTHUR WICKESSER
BY
ATTORNEY

Jan. 9, 1951 A. WICKESSER 2,537,498
TOTALIZING LIQUID LEVEL GAUGE
Filed Oct. 2, 1945 4 Sheets-Sheet 3

INVENTOR.
ARTHUR WICKESSER
BY Ernest D. Given
ATTORNEY

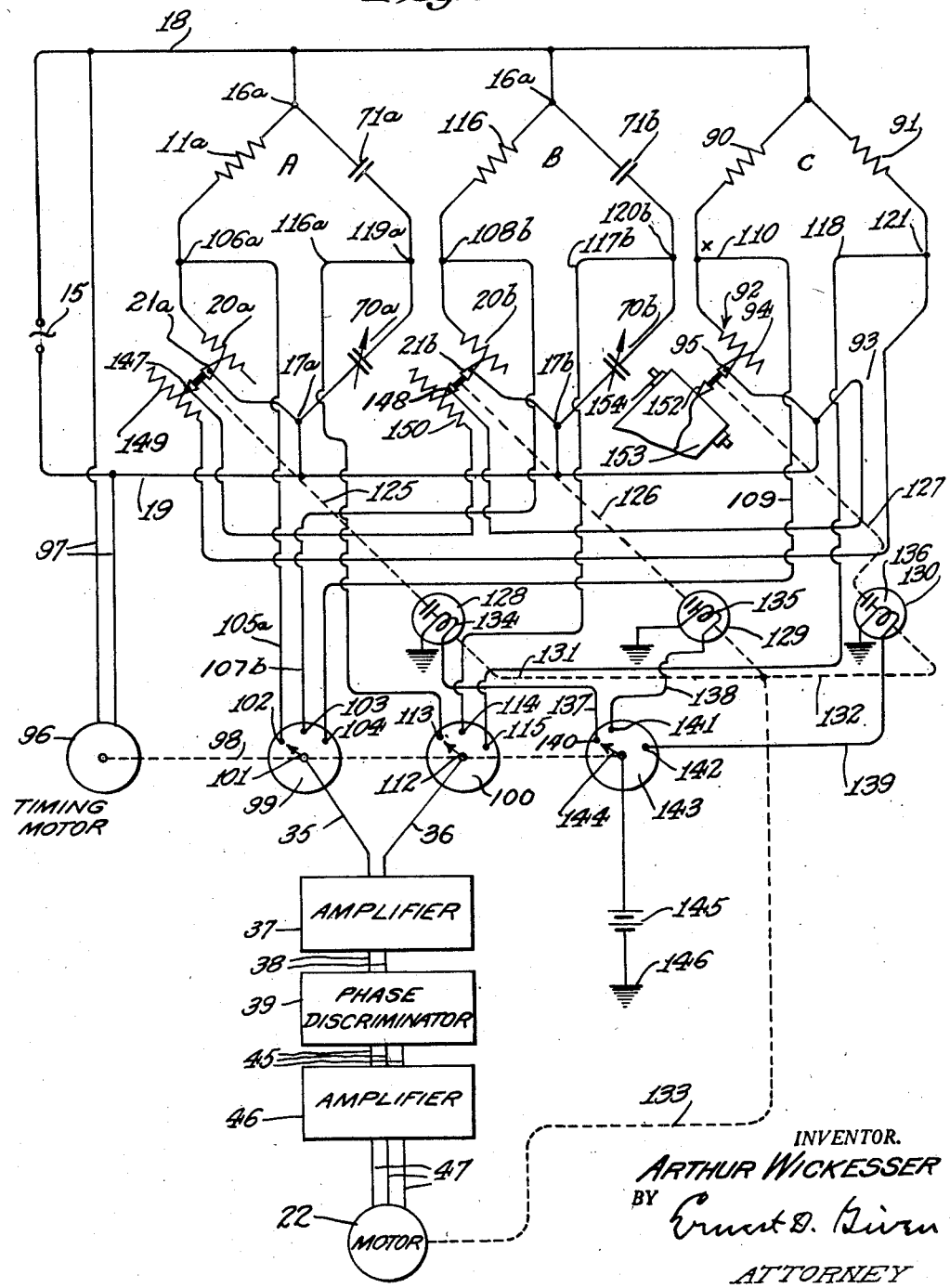

Patented Jan. 9, 1951

2,537,498

UNITED STATES PATENT OFFICE 2,537,498

TOTALIZING LIQUID LEVEL GAUGE

Arthur Wickesser, St. Albans, N. Y., assignor to The Liquidometer Corporation, Long Island City, N. Y., a corporation of Delaware Application October 2, 1945, Serial No. 619,754

4 Claims. (Cl. 73—313)

The invention relates to systems or devices for measuring, recording and/or controlling variations of a physical magnitude such as volume or level of a fluid, temperature, pressure, etc.; and particularly to devices of a type in which each of a plurality of variable physical magnitudes is measured or supervised by individual control or detecting means, which in turn control a common indicating and/or control device, so that the physical magnitude indicated by or controlling this device is always a function of all the supervised physical magnitudes, for instance, the total or average value thereof.

A now preferred, but by no means the exclusive field of application of a device according to the invention is the totaling or averaging of the contents of several tanks containing liquid such as fuel, so that the total contents of all the tanks or the average content of each tank is continuously known.

One of the objects of the invention is to provide a novel and improved electrical measuring device of the type above described in which each of a plurality of physical magnitudes to be supervised controls an impedance means, the individual impedance means being connected in a circuit system with an indicating and/or control device controlled by the variations of all the individual impedance means, so that the indications thereof are a function of all the physical magnitudes.

Another and still more specific object of the invention, also subordinated to and based on the foregoing, which is particularly advantageous for use in conjunction with a device or system for totaling or averaging the liquid contents in a plurality of tanks having non-uniform geometrical configurations, is a means causing each of the variable physical magnitudes, represented, for instance, by the positions of floats resting on the liquid in each of the tanks, to vary the electric value of the respective impedance means a predetermined uniform amount in response to a given change of the liquid content in the respective tank, independently of the variations or changes in liquid height, which correspond to such given change of the liquid contents at different sections of a tank due to the non-uniform geometrical configuration thereof. The provision of such means has the advantage that the indicating and/or control device, controlled by the individual impedance means, will always reflect the sum total of the tank contents irrespective of the geometrical configuration of the individual tanks. Furthermore, in the event it is desired to measure the average contents in a plurality of tanks, it is only necessary to divide the indications of the common indicating device, which may be calibrated in gallons or pounds, by the number of controlling impedance means. The indications of the device may then readily become a measure of the average quantity of gallons or pounds in each of the supervised tanks. It will be obvious that the total value and the average value are actually the same measured quantity, the difference between them being only the division by the number of tank units involved in the measurement.

In this connection it should be noted that a totaling and/or averaging device according to the invention can be combined with a conventional indicating system assigned to each tank. These systems will then indicate the individual fluid contents while the device according to the invention indicates continuously the total tank contents.

Other and further objects, features and advantages of the invention will be hereinafter set forth and the novel features thereof defined by claims appended hereto.

In the accompanying drawings several now preferred embodiments of the invention are shown by way of illustration and not by way of limitation.

In the drawings:

Fig. 6 is a circuit diagram of a modification of a measuring system according to the invention, the total tank contents being recorded on a chart.

Figures 1, 1A:
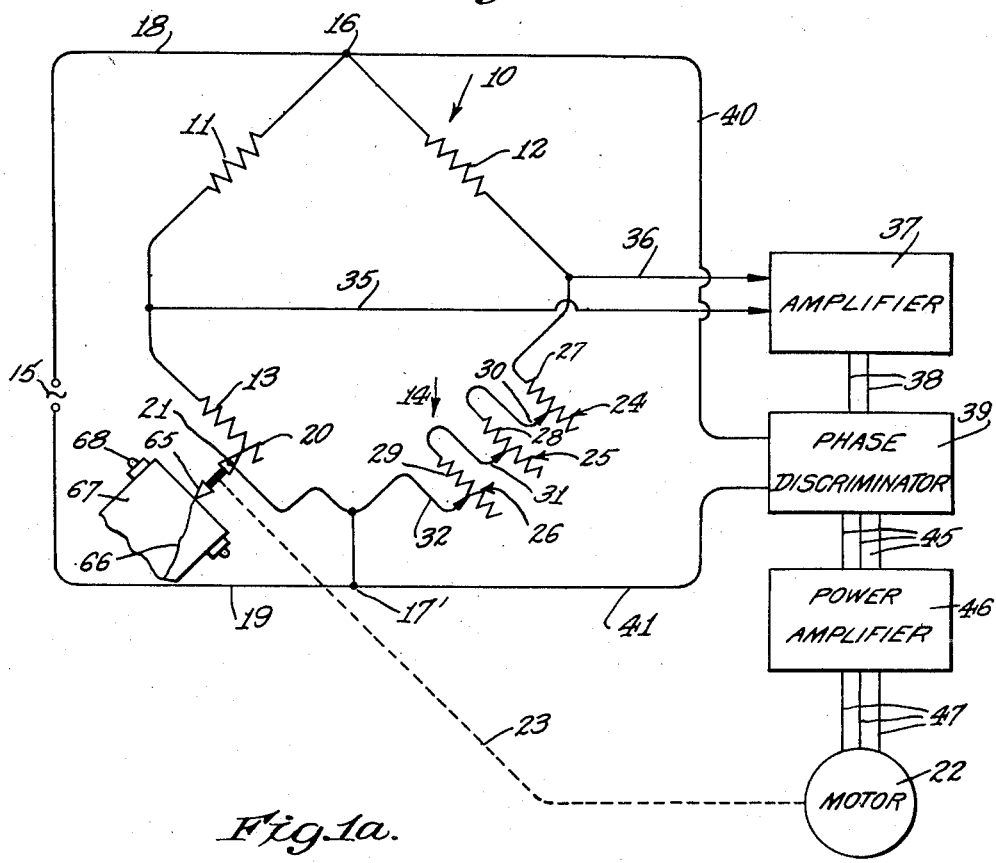
Fig. 1 is a circuit diagram of a measuring device according to the invention in which the impedance means controlled by the individual tanks consist of rheostats, the total tank contents being recorded on a chart.
Fig. 1a is a development of the chart used in the system according to Fig. 1.

Fig. 1 shows diagrammatically a circuit diagram of a measuring device for totaling and recording the liquid contents of three tanks containing liquid, for instance, fuel. The tanks may have either a uniform geometrical configuration or a non-uniform geometrical configuration as will be hereinafter more fully explained. Each tank is equipped with a float and linkage system controlled by the liquid level in the tank and controlling the resistance value of a rheostat. The three rheostats then control the resistance value of a common rheostat which in turn operates a recording device.

Referring now to Fig. 1 in detail, the circuit diagram shown in this figure comprises a bridge system such as a Wheatstone bridge generally designated 10 which is composed of four resistance arms, to wit: fixed resistors 11 and 12 and variable resistors generally designated 13 and 14. Current is supplied to the bridge from an A. C. source 15 connected to two points 16 and 17 of the bridge by wires 18 and 19.

The variable resistor 13, which may be of the rheostat type, comprises a stationary resistance element 20 slidably engaged by a slider contact 21. It will be obvious that the position of slider 21 on resistance element 20 controls the resistance value included by variable resistor 13 in the bridge system. The position of slider 21 is controlled by a motor 22 or any other suitable electrically controlled drive means which is operatively connected with slider 21 through a mechanical transmission system diagrammatically indicated by a dotted line 23.

Variable resistor 14 is composed of three series connected variable resistors, generally designated 24, 25 and 26, each as previously mentioned associated with a tank, the liquid contents of which is to be supervised. Each of the resistors 24, 25 and 26 comprises a stationary resistance element 27, 28 and 29. The three stationary resistance elements are engaged by sliders 30, 31 and 32 respectively. The positions of the sliders on the respective stationary resistors will determine the total resistance value included by variable resistor 14 in the bridge system.

It will be obvious that the bridge system as hereinabove described is capable of being balanced or unbalanced.

The bridge is connected by wires 35 and 36 to an amplifier 37 of conventional design. The amplifier is connected by wires 38 to a phase discriminator, which is also connected through wires 40 and 41 and wires 18, 19 to the supply voltage 15. The phase discriminator is connected by wires 45 to a power amplifier 46, which in turn is connected by wires 47 to motor 22.

When the bridge is balanced, the amplifier 37 will remain inactive. However, when the bridge is unbalanced, the amplifier will receive the unbalance voltage of the bridge through its input side and will apply its output, through wires 38 to the phase discriminator 39, which compares the phase of the output with the phase of the supply voltage 15. The phase discriminator determines the phase of the unbalance voltage after amplification and will furnish an input voltage to the power amplifier 46 which in turn will energize the motor 22 for rotation in a clockwise or counterclockwise direction according to the phase of the unbalance voltage. Various circuit systems for controlling the operation of a motor such as motor 22 by the previously described amplifier and phase discriminator arrangement are well known in the art and need not be described in detail. The direction of rotation of the motor is always so selected by the phase discriminator as to move slider 21 toward rebalancing the bridge.

The balance or unbalance of the bridge is controlled by the relative positions of sliders 30, 31 and 32 which positions, as previously mentioned, are controlled by the liquid levels in the fuel tanks or by variations of any other physical magnitudes which are supervised by the system.

Figure 2:
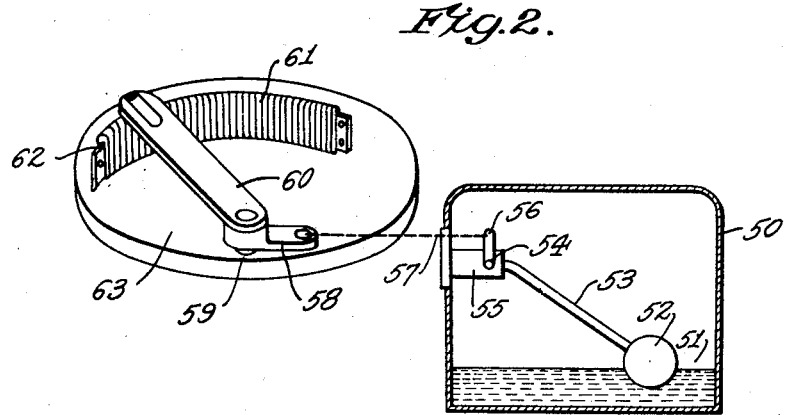
Fig. 2 is a diagrammatic view of one of the rheostats and a float and linkage system controlling the rheostat.
Figure 3:
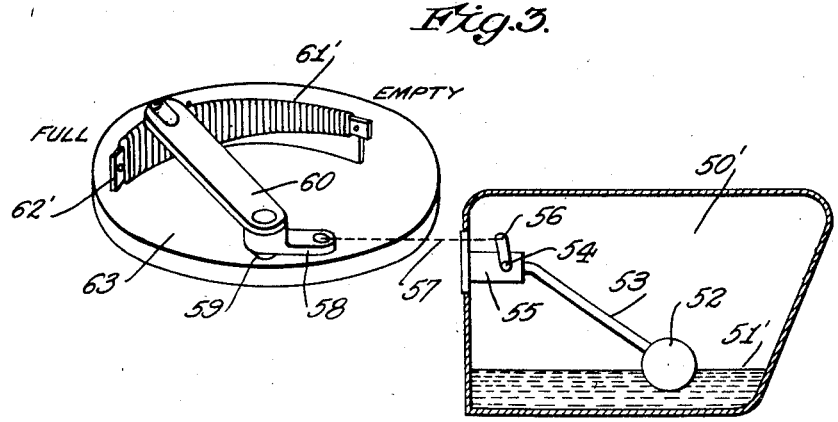
Fig. 3 is a diagrammatic view of one of the rheostats and the controlling float and linkage system, the rheostat being specifically designed for use in conjunction with a tank having a non-uniform geometrical configuration.

A simple arrangement of controlling the slider positions by liquid levels is shown in Figs. 2 and 3, Fig. 2 showing a tank having a uniform cross-section or geometrical configuration and Fig. 3 showing a tank having a non-uniform geometrical configuration.

Referring now to Fig. 2 in detail, this figure shows a substantially rectangular tank 50 having straight walls and containing a liquid 51, the level of which is to be measured. For the purposes aforesaid, a float 52 is provided which is fastened to a float arm 53 pivoted about a pivot 54 which is supported by a bracket 55 fastened to a wall of the tank. An arm 56 is rigidly fastened to float arm 53 and connected by a mechanical transmission system, indicated by a dotted line 57, to an arm 58 pivotal about a pivot 59. Pivot 59 also supports a slider contact 60 which corresponds to any one of the slider contacts 30, 31, 32 shown in Fig. 1. Slider 60 engages a resistance element 61 corresponding to any one of the resistance elements 27, 28 and 29 shown in Fig. 1. Resistance element 61 may consist of a resistance wire wound uniformly on an insulation carrier 62 supported by an insulation base 63. All sliders 60 and one terminal of each resistance element 61 are included in the bridge circuit in a series connection as has been shown in Fig. 1 for the corresponding variable resistors forming the variable bridge resistor arm 14.

As will be apparent, a rise or fall of the liquid 51 will cause a corresponding displacement of slider 60 on resistance element 61 and hence a corresponding portion of the effective resistance value of element 61 will be included in the bridge circuit. Since the walls of tank 50 are shown as being straight, a change of liquid height in the tank will always be proportional to a change in liquid contents (volume). Consequently, a change of the liquid contents in tank 50 will always result in a uniform change of the resistance value of resistance element 61, so that the changes in the resistance value of the uniformly wound resistance element 61 caused by the movements of slider 60 will accurately reflect the changes of the liquid contents in the tank.

It will, of course, be understood that the float and linkage system shown in Fig. 2 is shown only for purposes of illustration and that in practice any one of the conventional float and linkage systems well known in the art may be used for such purposes.

As previously explained, a variable resistor arrangement such as shown in Fig. 2, is associated with each tank to be supervised. Consequently, the sum total of the effective resistance value of bridge resistance arm 14 will be a function of the liquid contents in all the tanks, and the effective resistance value of the bridge resistance arm 13, when the bridge is balanced by the operation of motor 22 as previously described, will be a function of the resistance value of bridge resistance arm 14.

The varying resistance value of variable resistor 13 is used to actuate an instrument indicating or recording the total contents of all tanks supervised. For the purposes aforesaid, contact slider 21 of variable resistor 13 supports a recording pen or a stylus 65 which marks a line 66 on a paper chart 67 driven at a uniform time rate by a drum 68. A calibration on the chart in gallons then indicates the total contents of all the tanks or the average contents of each tank if preferable. Fig. 1a shows a development of chart 67, which is calibrated in gallons, for indicating the total contents of the tanks. When it is desired to indicate the average contents of each tank, the total contents indications must be divided by three, corresponding to the number of tanks supervised.

Referring now to Fig. 3 in detail, this figure, as previously mentioned, shows a variable resistor for detecting liquid level changes in a tank having a non-uniform geometrical configuration. As will be obvious, in a tank of such configuration a given change in liquid height is no longer directly proportional to the change in liquid contents. Since it is desirable in practice to have a uniform change of the resistance value of variable resistor 13 in response to a given change in the liquid contents of the tanks supervised, the variable resistors forming bridge resistance arm 14 are so arranged and constructed that a given change in contents will always correspond to a uniform change in resistance value. For the purposes aforesaid, the resistance element engaged by slider 60 which was shown in Fig. 2 as a uniformly wound resistance element, is now shown as a tapered resistance element 61', so that it will have a variable number of ohms per inch. The taper of the resistance element corresponds to the shape of tank 50', so that a change, for example, of ten gallons in the tank moves the slider 60 to vary the effective resistance of the variable resistor by the same number of ohms regardless of the change in liquid height causing such displacement of the slider.

Figure 4:
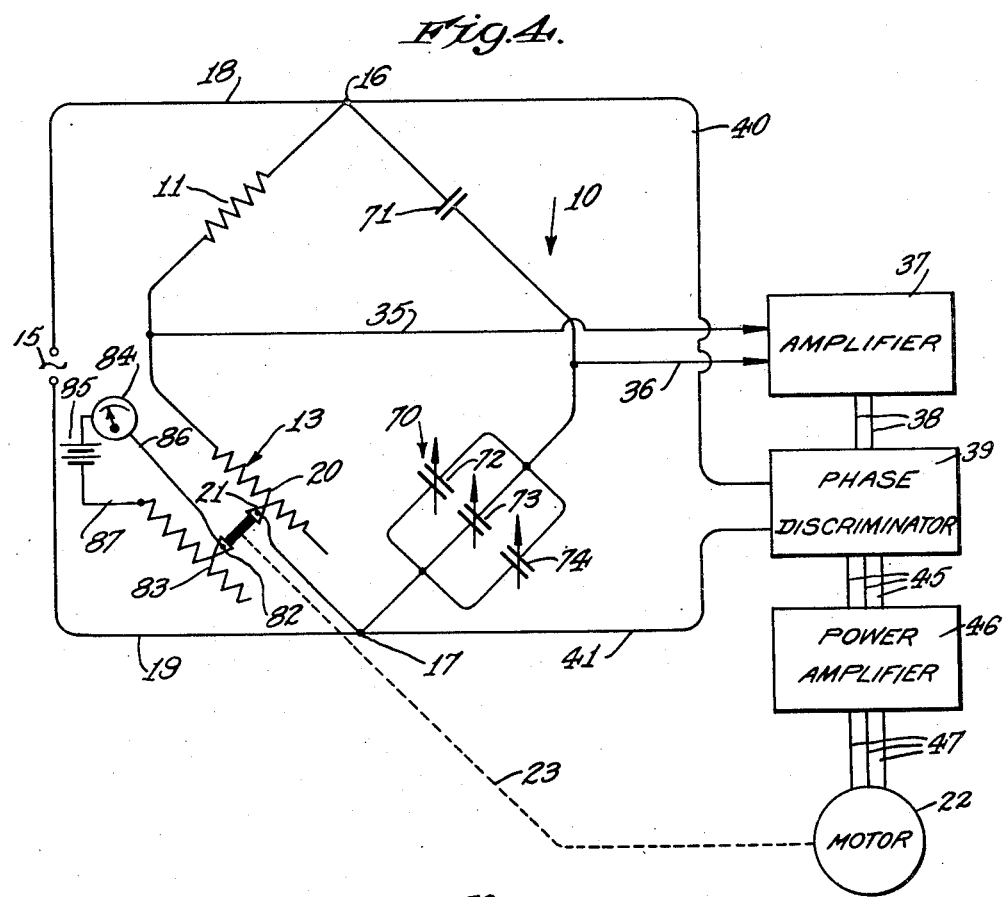
Fig. 4 is a circuit diagram of a measuring system according to the invention in which the impedance means consist of variable capacitances connected in parallel.

The circuit diagram shown in Fig. 4 is basically similar to the circuit diagram shown in Fig. 1 and identical numerals are used to designate corresponding parts. The circuit diagram according to Fig. 4 is distinguished from the diagram according to Fig. 1 by employing a variable capacitance arm, generally designated 70, instead of the variable resistance arm 14 of Fig. 1. Correspondingly, a fixed capacitance 71 is provided instead of fixed resistor 12 of Fig. 1. Variable capacitance arm 70 is shown as being composed of three variable capacitances 72, 73 and 74 connected in parallel and each associated respectively with a tank to be supervised. It will be obvious from the description of Fig. 1 that the total capacitance value of capacitance arm 70 is varied by the total contents of all the tanks which control the balance or unbalance of the bridge generally designated 10, and that motor 22 will move slider 21 toward balancing of the bridge when the bridge has become unbalanced.

Figure 5:
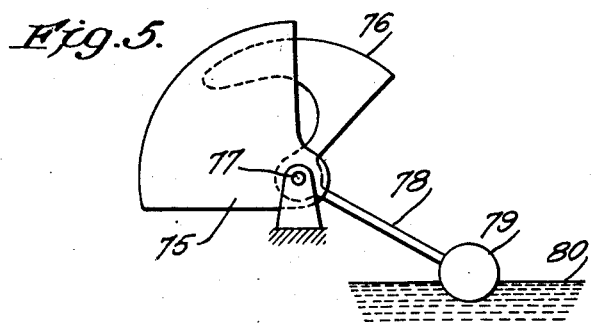
Fig. 5 is a diagrammatic view of one of the capacitances specifically designed for use in conjunction with a tank having a non-uniform geometrical configuration.

Fig. 5 shows diagrammatically the arrangement of any one of the variable capacitances 72, 73 and 74 (Fig. 4) for a tank having a non-uniform geometrical configuration. The capacitor as shown in Fig. 5 comprises a fixed plate 75 or a series of such plates connected in parallel and a shaped rotor plate 76 or a series of such rotor plates connected in parallel. Rotor plate 76 is pivotally supported by a pivot 77 and fastened to a mechanical transmission such as a float arm 78 supporting a float 79 resting on the level of liquid 80, contained in a tank having a non-uniform geometrical configuration, the contents of which is to be supervised. Thus a change of the liquid level in the tank will impart a corresponding movement to the rotor plate 76 relative to the fixed plate 75. The rotor plate is shaped corresponding to the configuration of the tank so that the capacitance of the variable capacitor formed by the plates 75 and 76 is always directly proportional to the liquid contents in the tank rather than to the liquid height. The shaping of the capacitor plates can be easily and conveniently accomplished, also the adjustment or calibration of such shaped capacitors after manufacture to any desired tank configuration.

As will be obvious, slider 21 will again be moved through a given distance in response to a given change in the liquid contents of all the tanks independent of the change of the liquid height in the tanks supervised by the variable capacitors 72, 73 and 74. As a result, the resistance element 20 can be wound uniformly. Such uniformly wound resistance element can be more readily and less expensively manufactured in quantity than non-uniformly wound resistance elements such as shown in Fig. 3.

It is believed to be clear from Fig. 1 and the description thereof that the position of slider 21, as controlled by motor 22, is used to measure the total contents of all tanks supervised or the average contents of each tank depending on the calibration of the measuring instrument. In the circuit diagram according to Fig. 4, the indicating system comprises a second slider contact 82 slidably engaging a resistance element 83 which may be uniformly wound. The rheostat formed by parts 82 and 83 controls the indications of a suitably calibrated measuring instrument such as a milliammeter 84 with which the rheostat is connected through a battery 85 and wires 86 and 87. It will be obvious that instrument 84 will be controlled by the position of slider 82 which in turn is controlled by the position of slider 21.

It should be understood that a recording device such as is shown in Fig. 1 may also be used in a system according to Fig. 4 and, vice versa, the indicating system of Fig. 4 can be used in the system according to Fig. 1.

Fig. 6 shows a modification of the invention which is based on the same principle as the previously described systems, but is distinguished therefrom by providing an individual bridge for each tank, the contents of which is to be supervised. The individual bridges control a totaling bridge which in turn controls the indications of a measuring device. Two individual bridges are shown which are similar to the bridge shown in Fig. 4, therefore identical but lettered numerals are employed to designate corresponding parts. The amplifier and phase discriminating arrangement is common to all bridge circuits.

Referring now to Fig. 6 in detail, each of the individual bridges A and B includes a variable capacitance 70a and 70b respectively which, may be designed as shown in Fig. 5 or may have uniformly shaped electrodes when the tank has a uniform geometrical configuration. As described in connection with Fig. 4, a variation of the capacitance of these variable capacitors, as caused by a change of the liquid level in the respective tanks, controls the operation of motor 22 which serves to balance the totaling bridge. This totalizing bridge C comprises two fixed resistance arms 90 and 91, a variable resistance arm generally designated 92 and a variable resistance arm generally designated 93, the resistance value of which is controlled by the individual bridges A and B as will be more fully explained hereinafter. The variable resistance arm 92 comprises a stationary resistance element 94 and a slider contact 95 engaging resistance element 94. The position of this slider, which corresponds to slider 21 of Fig. 4, is so controlled as to be a function of the adjustment of the individual bridges A and B which, in turn are controlled by the contents of the tanks respectively associated therewith.

For the purpose of controlling the position of slider 95 as aforesaid, a timing motor 96 of conventional design is provided, which is connected to the source of current 15 or any other suitable source of current by wires 97. This timing motor is operated at a uniform speed and through a mechanical transmission 98, indicated by dotted lines, slowly turns rotary switches 99 and 100. Rotary switch 99 rotates a contact arm 101 which successively engages stationary contact points 102, 103 and 104. Contact 102 is connected by a wire 105a to a bridge point 106a of the bridge A, contact point 103 is connected by a wire 107b to a contact point 108b of the bridge B, and contact point 104 is connected by a wire 109 to a contact point 110 of the totaling bridge C. Similarly rotary switch 100 rotates a contact arm 112, which engages successively at timed intervals stationary contact points 113, 114 and 115, which are connected by wires 116a, 117b and 118 to points 119a, 120b and 121 of the respective bridges. Contact arms 101 and 112 are connected by wires 35 and 36 to amplifier 37. As will now be apparent, the input wires 35, 36 of amplifier 37 are switched at a uniform time rate from one individual bridge circuit to the second one and then to the totaling bridge. It will be obvious that the effect of such switch arrangement is the same as if an amplifying and phase discriminating system were provided for each bridge circuit for part of the time only. It is assumed and may be assumed in practice that the liquid level changes which control the capacitances 70a and 70b occur at a rate which is slow compared with the time allotted to each bridge circuit for rebalancing purposes by the timing motor so that each bridge may be considered as being continually close to balance.

The sliders 21a, 21b and 95 of the rebalancing resistors in the bridge circuits are each connected by mechanical transmissions 125, 126 and 127 respectively, indicated by dotted lines, to one clutch element of electromagnetic clutches 128, 129 and 130 of conventional design. The other element of each clutch is mechanically coupled by transmissions 131, 132 and 133 to motor 22. The coils 134, 135 and 136 respectively of the clutches are connected by wires 137, 138 and 139 to stationary contacts 140, 141 and 142 of a third rotary switch 143. These contacts are engaged by a contact arm 144 which is slowly rotated by timing motor 96 through transmission 98, so that the switch contacts 140, 141 142 respectively are successively closed at timed intervals. Contact arm 144 is connected to one terminal of a battery 145, the other terminal of the battery being grounded at 146. Consequently, the clutch coils are successively energized as the respective contact points 140, 141, 142 are engaged, thereby connecting the respective sliders 21a, 21b and 95, one at a time, with the motor 22 for displacement of the sliders relative to the respective stationary resistance element.

Sliders 21a and 21b support each a second slider contact 147 and 148 respectively which engage stationary resistance elements 149 and 150 respectively. The sliders 147, 148 and the corresponding resistance elements 149, 150 are connected in series and constitute the variable resistance arm 93 of the totaling bridge.

Slider 95 of the totaling bridge supports a pen or stylus 152 which marks a chart 153 driven at a uniform time rate by a drum 154. This chart may be calibrated as has been described in connection with Fig. 1.

As it will be apparent from the previous description, a change of the liquid level in one of the supervised tanks will result in a corresponding change of the respective capacitance which, will set the self-balancing action of the respective bridge in motion at timed intervals controlled by the timing motor. The displacement of the sliders 147, 148 will result in a corresponding change of the resistance in the totalizing circuit of the elements 149, 150 engaged thereby. Consequently, the resistance of variable resistance arm 93 of the totaling bridge will be a function of the resistance values of the variable resistance arms of the individual bridges, and the self-balancing action of the totaling bridge will cause a line to be drawn on chart 153 corresponding to the total contents of all the tanks.

It will, of course, be understood that instead of the recording system shown in Fig. 6, a measuring instrument such as shown in Fig. 4 may be provided.

The specific design of the timing motor, the rotary switches and the clutches has not been shown and described in detail, these elements being of conventional design.

While the invention has been described in detail with respect to certain particular preferred examples and embodiments, it will be understood by those skilled in the art, after understanding the invention, that various changes and modifications may be made without departing from the spirit and scope of the invention, and it is intended therefore, in the appended claims, to cover all such changes and modifications.

What is claimed is:

1. In an electrical device for indicating the liquid contents at any time in a plurality of tanks containing liquid and having varying geometrical configurations, the combination of an electrical bridge system having two fixed impedance arms and two variable impedance arms, a source of current connected with the bridge for energizing the bridge, one of said variable impedance arms being composed of a plurality of variable impedance means, one being provided for each tank to be supervised, each impedance means comprising two relatively movable members, the relative position of the members controlling the impedance value of the respective impedance means, a plurality of prime movers, each of the prime movers being controlled by liquid level changes in one of the tanks and operatively connected with one of the said members for displacement thereof relative to the other of said members, the impedance value of each of the impedance means being distributed in a predetermined relation to the configuration of the respective tank for causing a uniform variation of the said impedance value in response to a given change of the liquid contents in the tank effecting a varying displacement of the prime mover as determined by the tank configuration, the other of said variable impedance arms comprising a resistance element and a contact slidably engaging the resistance element; an electric reversible motor operatively connected with said contact for displacement thereof on the resistance element thereby changing the effective value of the resistance element, an electric control system connected in circuit with the bridge system for control by the balance conditions in the bridge, said control system being connected in a circuit with the motor to energize the same for rotation in one or the other direction for moving the slider contact into a position on the resistance element in which the bridge is in balance and to stop the motor when the bridge is in balance; and a measuring system controlled by the said position of the slider contact thereby measuring the total contents of all the tanks to be supervised.

2. In an electrical device for totalling a plurality of variable physical magnitudes, the combination of a plurality of measuring electrical bridge systems, each having two fixed impedance arms and two variable impedance arms, a plurality of prime movers, each being controlled by a change of one of the physical magnitudes to be supervised respectively and operatively connected with one of said variable arms of one of said bridges respectively for controlling the impedance value of the controlled arm, the second variable arm of each of said bridges comprising two relatively movable members, the relative positions of said members controlling the impedance value of said second variable arm of each of said bridges, a variable impedance means operatively connected respectively with one of the members of each of said second variable arms and having its impedance value controlled by the relative position of said two relatively movable members, a totalling electrical bridge system comprising two fixed impedance arms and two variable impedance arms, one of the variable arms of said totalling bridge being constituted by all the said impedance means, the second variable arm of the totalling bridge comprising two relatively movable members, the relative position of which controls the impedance value of the said second variable arm of said totalling bridge, an electrically controlled drive means constructed to be operatively mechanically connected with one of said members of the second variable arm of each of said bridges, an electric control circuit connected to said drive means and selectively and sequentially connected to all said bridges so as selectively and sequentially to control the operation of said drive means in response to electrical unbalance of said bridges respectively by operating said drive means during the time period it is respectively connected to a member of the second arm of each bridge so as to move such member in a direction to rebalance the respective bridge, a timing device for operatively sequentially connecting said drive means successively with the said members of the second variable arms of each of said bridges and concomitantly connecting said control circuit to each of said bridges respectively, and a measuring device controlled by the position of one of the members of the second variable arm of said totalling bridge for measuring the total value of all the physical magnitudes supervised.

3. Electrical device as described in claim 1, wherein a resistance element is included in a circuit with the measuring system, and wherein said slider contact is connected with a second contact for movement in unison therewith, said second contact being electrically insulated from the slider contact and arranged to slidably engage the resistance element in the measuring circuit, thereby varying the said resistance element corresponding to the total value of the said impedance means.

4. An electrical device according to claim 1, wherein said measuring system includes a recording device comprising a recording stylus, and wherein said slider contact is connected with said stylus for movement in unison therewith, thereby causing said stylus to be displaced corresponding to the total value of the liquid contents of all the tanks.

ARTHUR WICKESSER.

REFERENCES CITED

The following references are of record in the file of this patent:

UNITED STATES PATENTS

| Number | Name | Date |
|---|---|---|
| 1,407,078 | Murray | Feb. 21, 1922 |
| 2,123,142 | McMaster | July 5, 1938 |
| 2,188,628 | Freystedt | Jan. 30, 1940 |
| 2,273,850 | Ewald | Feb. 24, 1942 |
| 2,357,023 | Reid et al. | Aug. 29, 1944 |
| 2,388,559 | Macintyre | Nov. 6, 1945 |

FOREIGN PATENTS

| Number | Country | Date |
|---|---|---|
| 243,318 | Great Britain | Dec. 20, 1926 |
| 385,265 | Great Britain | Mar. 13, 1930 |
| 481,103 | Great Britain | Feb. 28, 1938 |